United States Patent [19]

Honda et al.

[11] 4,109,894

[45] Aug. 29, 1978

[54] PILOT VALVE DEVICE FOR REGULATING THE FLOW OF A FLUID

[75] Inventors: Haruo Honda; Hiroshi Itoh, both of Hitachi, Japan

[73] Assignee: Hitachi, Ltd., Japan

[21] Appl. No.: 692,637

[22] Filed: Jun. 4, 1976

[30] Foreign Application Priority Data

Jun. 18, 1975 [JP] Japan .................. 50-73865

[51] Int. Cl.² .......................................... F16K 31/143
[52] U.S. Cl. ....................................... 251/30; 251/25; 91/25
[58] Field of Search ................... 251/25, 30, 38, 39; 91/25

[56] References Cited

U.S. PATENT DOCUMENTS

| 2,575,719 | 11/1951 | Leeds ................................. 251/30 X |
| 3,842,857 | 10/1974 | McCornack ......................... 251/39 X |
| 3,908,106 | 9/1975 | Hirasawa et al. .................. 251/30 X |

FOREIGN PATENT DOCUMENTS 1,048,601 12/1953 France ........................................ 251/39

*Primary Examiner*—Arnold Rosenthal
*Attorney, Agent, or Firm*—Craig & Antonelli

[57] ABSTRACT

A pilot valve device adapted to be brought to an open position in response to a mechanical signal so as to cause a compressed fluid to actuate an operating valve. The pilot valve device comprises a main valve located in a pilot valve chamber, and a daughter valve located in a daughter valve chamber formed in the main valve. When a mechanical signal is applied to the daughter valve and brings the same to an open position, a compressed fluid contained in the pilot valve chamber is introduced into a main valve actuating chamber, with the result that the main valve is brought to an open position to permit the compressed fluid to flow into an operating valve actuating chamber.

8 Claims, 4 Drawing Figures

PILOT VALVE DEVICE FOR REGULATING THE FLOW OF A FLUID

BACKGROUND OF THE INVENTION

This invention relates to pilot valve devices for regulating the flow of a fluid, and more particularly it is concerned with a pilot valve device of the type which is adapted to be brought to an open position in response to a mechanical signal so as to cause a compressed air to actuate an operating valve, wherein the operating valve can be actuated at high speed even if it is large in size.

A puffer type gas circuit breaker typifies the use of a pilot valve device for causing a fluid to actuate the operating valve in response to a mechanical signal. To meet an ever increasing demand for electric power by supplying electricity of high quality, there has in recent years been a growing demand for puffer type gas circuit breakers of extrahigh voltage and large capacity. Because of this, puffer type gas circuit breakers are required to operate at high speed by performing a two-cycle interruption, for example, in order to ensure transient security for the power system. Accordingly, the pilot valve device used with a puffer type gas circuit breaker for regulating the flow of a fluid is desired to have a construction such that it actuates the operating valve at high speed in response to a mechanical signal. On the other hand, the number of breaks per pole of circuit breakers increase when the circuit breakers are of extrahigh voltage. For example, the number of breaks per pole is generally four in the case of circuit breakers of a rated voltage of 550 KV. As a result, the weight of movable parts of the circuit breakers of this type has more than doubled that of movable parts of circuit breakers of a conventional 300 KV rating in which the number of breaks per pole is two. This necessitates the use of a larger operating force for actuating the circuit breakers, and consequently larger operating valves are required. However, conventional pilot valve devices are of a construction such that they are not suitable for actuating operating valves of a large size at high speed.

More specifically, the system which has hitherto been used for actuating the operating valve for a circuit breaker is as follows. A coil is excited by an electrical signal to disengage the hook of a hook mechanism by the magnetic force of the coil, so that a rod is actuated by the biasing force of a spring to apply a mechanical signal to a pilot valve to bring the same to an open position. Upon the pilot valve being opened, compressed air is caused to flow into the operating valve actuating chamber so as to drive an operating valve piston. If such system is used for actuating the aforesaid operating valve of a large size, a pilot valve of a larger size will be required. This in turn will make it necessary to use an operating spring of a larger biasing force for opening the pilot valve against the sealing pressure of a compressed fluid which is normally sealed in the pilot valve. An increase in the biasing force of the spring will result in an increase in the surface pressure of the engaging portion of the hook and also in an increase in the size of the hook. As a result, the moment of inertia of the pivotal movement of the hook will grow larger. Thus, technical difficulty will be encountered in causing the pilot valve of the prior art to operate at high speed.

Moreover, in the conventional pilot valve of the type described, upper and lower valve seats will necessarily have a small area if it is required to cause the pilot valve to operate at high speed while imparting to the pilot valve a valve seat pressure (usually 20 to 40 kg/cm$^2$) which is necessary for sealing the compressed fluid within the pilot valve. The result of this is that the valve seats are relatively sharp in shape, thereby causing damage to packings with which the valve seats are brought into abutting engagement.

SUMMARY OF THE INVENTION

Accordingly, an object of the present invention is to provide a pilot valve device of an improved construction for regulating the flow of a fluid, wherein the pilot valve device is brought to an open position in response to a mechanical signal so as to cause a fluid to flow into an operating valve actuating chamber to render the operating valve operative.

Another object of the invention is to provide, in the pilot valve device of the type described, a structural arrangement which permits the pilot valve device to operate at high speed even if the operating valve is large in size.

Still another object of the invention is to provide, in the pilot valve device of the type described, a structural arrangement wherein upper and lower valve seats of the pilot valve device each have a valve seat area of the size which does not cause damage to the packings with which the valve seats are brought into abutting engagement.

Still another object of the invention is to provide, in the pilot valve device of the type described, a structural arrangement which makes the pilot valve device particularly suitable for regulating the flow of a fluid for driving the operating valve piston of a puffer type gas circuit breaker, the pilot valve device being capable of operating at high speed even if the operating valve piston is large in size so that it is possible to cause the operating valve piston to operate at high speed.

In accordance with the present invention, there is provided a pilot valve device comprising a housing defining a pilot valve chamber filled with a compressed fluid, a main valve located in the housing, and a daughter valve located in a daughter valve chamber in the main valve. The daughter valve is brought to an open position in response to a mechanical signal applied thereto, thereby causing the compressed fluid contained in the pilot valve chamber to act on the main valve and open the same so as to permit the compressed fluid to actuate the operating valve.

The daughter valve is preferably arranged substantially coaxially with the main valve.

The mechanical signal is preferably applied to the daughter valve through the agency of a push rod slidably fitted in an orifice formed in the top wall of the housing.

DESCRIPTION OF THE PREFERRED EMBODIMENT

Figure 1:
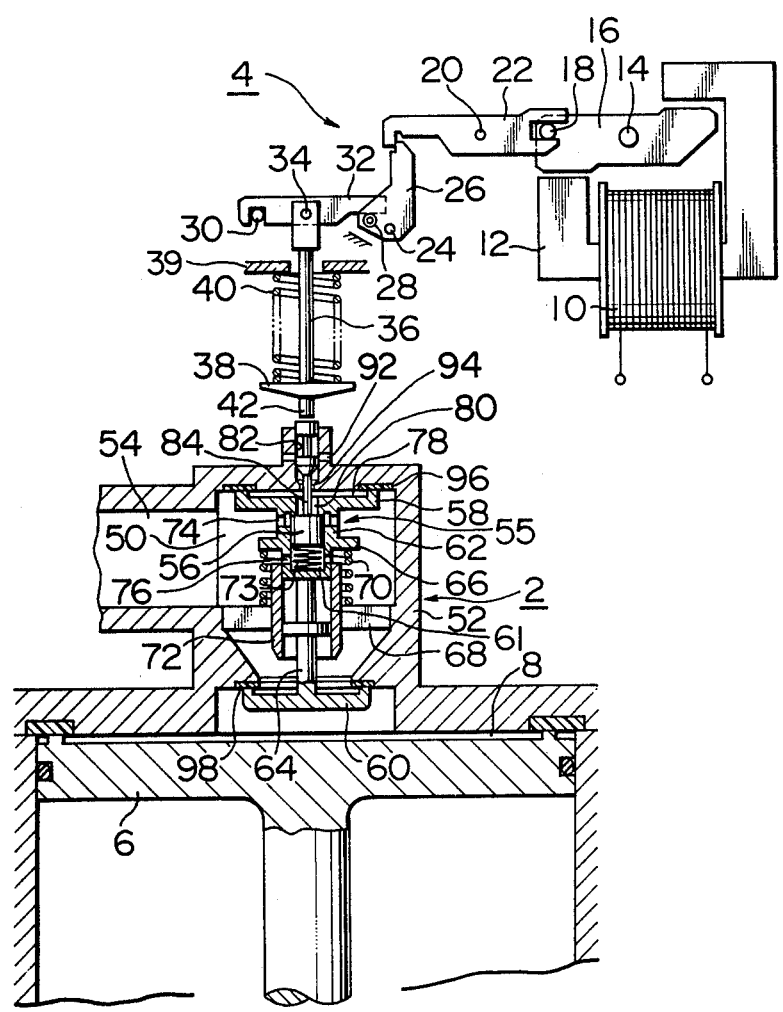
FIG. 1 is a sectional view of a preferred embodiment of the pilot valve device in accordance with this invention, which is interposed between the hook mechanism and the operating valve.

A preferred embodiment of this invention will now be described with reference to the accompanying drawings in which the invention is applied to a puffer type gas circuit breaker for actuating the operating valve piston thereof. Referring to FIG. 1, the pilot valve device according to the invention is generally designated by the reference numeral 2 and adapted to receive a mechanical signal from a tripping hook mechanism, generally designated by the reference numeral 4. In response to the mechanical signal, the pilot valve device 2 is brought to an open position so as to permit a compressed air to flow into an operating valve actuating chamber 8 for driving an operating valve piston 6. When the compressed fluid flows into the operating valve actuating chamber 8, the operating valve piston 6 moves downwardly thereby rendering a puffer type gas circuit breaker operating mechanism (not shown) operative to open the circuit breaker.

The hook mechanism 4 is of known construction and will therefore be described briefly. The mechanism 4 comprises a core 12 provided with a coil 10, and an armature 16 located between two ends of the core 12 and pivotally supported by a pin 14. The armature 16 has affixed to one end thereof a pin 18 which is loosely received in a bifurcated end of a first hook 22 pivotally supported by a pin 20 and engaging at the other end thereof one end of a second hook 26 pivotally supported by a pin 24. Thus, the other end of the first hook 22 and one end of the second hook 26 constitute an engaging portion. Mounted in the vicinity of the other end of the second hook 26 is a roller 28 which supports one end of a lever 32 which can move in pivotal motion about a pin 30. A rod 36 is pivotally connected through a pin 34 to the central portion of the lever 32. The rod 36 has affixed to its lower portion a support plate 38, with an actuation compression spring 40 being mounted between the support plate 38 and a fixed plate 39. Upon energization of the coil 10 of the hook mechanism 4 constructed as aforesaid, the first hook 22 and second hook 26 are brought out of engagement with each other at the engaging portion. This allows the rod 36 to be moved downwardly by the biasing force of the spring 40, so that a lower end 42 of the rod 36 applies a mechanical signal to the pilot valve device 2.

The pilot valve device 2 which comprises a preferred embodiment of the invention includes a housing 52 defining a pilot valve chamber 50 therein. The pilot valve chamber 50 is maintained at all times in communication with a source (not shown) of a compressed fluid, preferably compressed air, through a passage 54, and is adapted to communicate with the operating valve actuating chamber 8 when the pilot valve device 2 is brought to its open position. Housed in the pilot valve chamber 50 is a main valve 55 of the illustrated construction in which is located a daughter valve 56 which is arranged substantially coaxially with the main valve 55. These elements are essential parts of this invention. Preferably, the daughter valve 56 is cylindrical in shape and made from polytetrafluoroethylene.

The main valve 55 essentially comprises an upper valve seat 58, a lower valve seat 60, a daughter valve housing 62 disposed adjacent the upper valve seat 58 and defining a daughter valve chamber 61 therein, and a connecting rod 64 for connecting the daughter valve housing 62 to the lower valve seat 60. A flange 66 is formed substantially in the central portion of the daughter valve housing 62, and a coil spring 70 normally urging the main valve 55 to move upwardly by its biasing force is mounted between the flange 66 and a support plate 68 extending inwardly from the side wall of the housing 52. The support plate 68 is formed in its central portion with a cylindrical guide 72 for the main valve 55 as illustrated. By this arrangement, it is possible for the main valve 55 to be moved upwardly by the biasing force thereof in a stable manner. A coil spring 73 normally urging the daughter valve 56 to move upwardly by its biasing force is mounted within the daughter valve chamber 61 in the daughter valve housing 62. A plurality of small apertures 74 and 76 are formed, as illustrated, in upper and lower portions of the daughter valve housing 62 so as to maintain communication between the daughter valve chamber 61 and the pilot valve chamber 50.

The upper valve seat 58 of the main valve 55 is shaped such that, when it is brought into engagement with the inner surface of the top wall of the housing 52 as the main valve 55 is brought to its closed position, a main valve actuating chamber 78 is defined between the upper valve seat 58 and the inner surface of the top wall of the housing 52. The upper valve seat 58 is formed in its central portion with a passage 80 for permitting the daughter valve chamber 61 to communicate with the main valve actuating chamber 78. Thus, when the daughter valve 56 is in its closed position (See FIG. 2), communication between the main valve actuating chamber 78 and the daughter valve chamber 61 is blocked; and when the daughter valve 56 is brought to its open position (See FIG. 3), communication between the main valve actuating chamber 78 and the daughter valve chamber 61 is opened through the passage 80, thereby permitting the main valve actuating chamber 78 to communicate with the pilot valve chamber 50 through the upper small aperture 74.

The housing 52 is formed in its top wall with an orifice 82 which is positioned such that it is aligned with the passage 80 and receives a push rod 84 slidably fitted therein. The push rod 84 is arranged such that, when the main valve 55 and the daughter valve 56 are both in the closed position, the lower end of the push rod 84 abuts against the upper surface of the daughter valve 56 (See FIG. 2). When the rod 36 of the hook mechanism 4 is moved downwardly, the lower end 42 thereof comes into engagement with the upper end of the push rod 84 and moves the latter downwardly. This causes the daughter valve 56 to move downwardly against the biasing force of the spring 73, thereby bringing the daughter valve 56 to its open position (See FIG. 3). The push rod 84 is formed at its upper end and substantially in its central portion with larger diameter portions 86 and 88 respectively which are maintained in sliding engagement with the inner surface of the orifice 82. The central larger diameter portion 88 is formed preferably with two slits 90 therein which slits are disposed in diametrically opposed positions on the outer periphery thereof. Apertures 92 are formed in the vertically extending portion of the top wall of the housing 52 defining the orifice 82. Thus, when the push rod 84 is in its inoperative position, the main valve actuating chamber 78 is maintained in communication with the atmosphere through the apertures 92. Upon the push rod 84 moving downwardly, the central larger diameter portion 88 thereof it brought into abutting engagement with a projection 94 formed on the inner surface of the orifice 82 and disposed adjacent the main valve actuating chamber 78. Thus, the central larger diameter portion 88 performs the function of a stopper for restricting the downward movement of the push rod 84, and at the same time it performs a valving action to block communication between the main valve actuating chamber 78 and the atmosphere.

Packings 96 and 98 are mounted in portions of the top wall and the bottom wall of the housing 52 against which the upper valve seat 58 and the lower valve seat 60 are brought into abutting engagement respectively.

Figure 2:
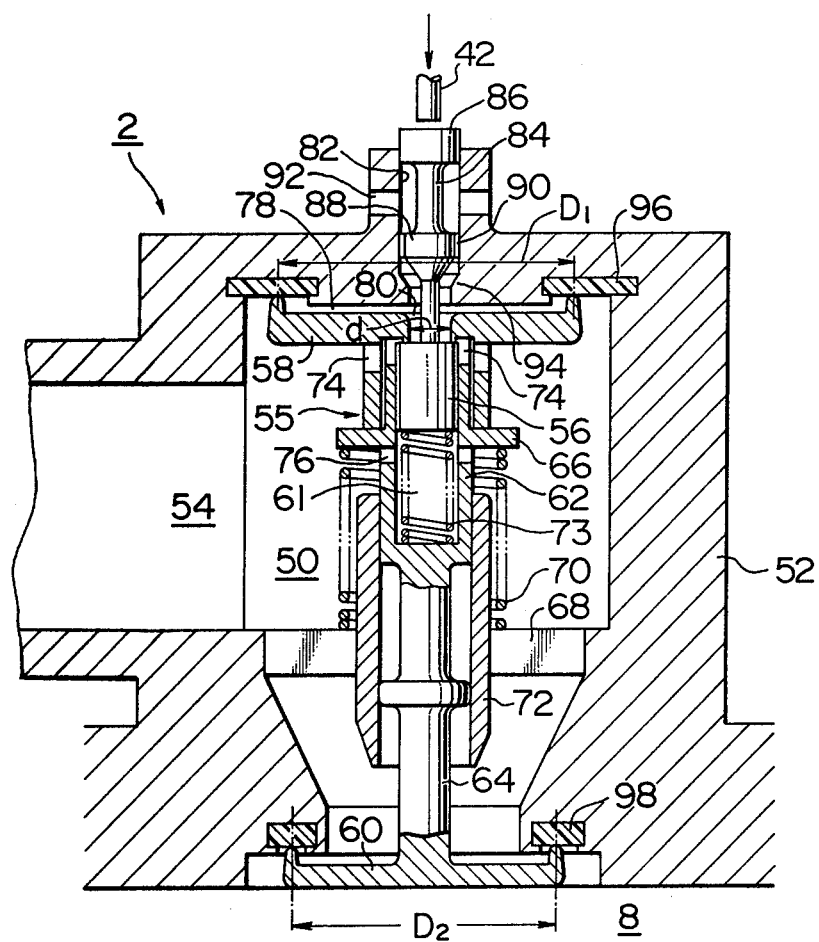
FIG. 2 is a sectional view, on an enlarged scale, of the pilot valve of FIG. 1, showing both the daughter valve and the main valve in a closed position.
Figure 3:
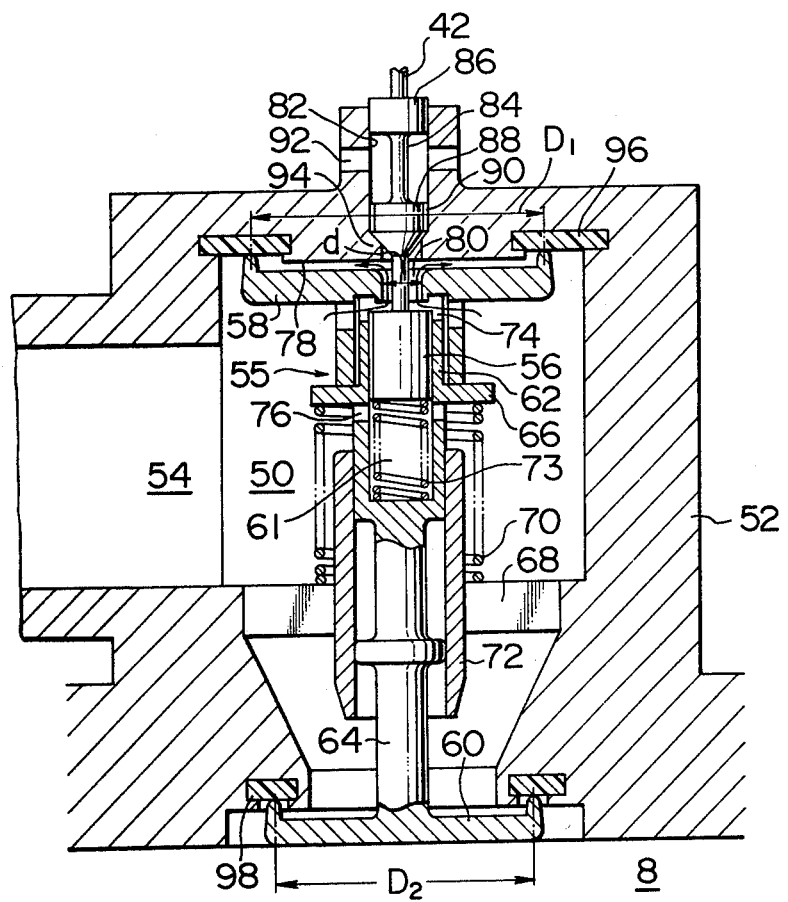
FIG. 3 is a view similar to FIG. 2 but showing the daughter valve in an open position and the main valve in a closed position.
Figure 4:
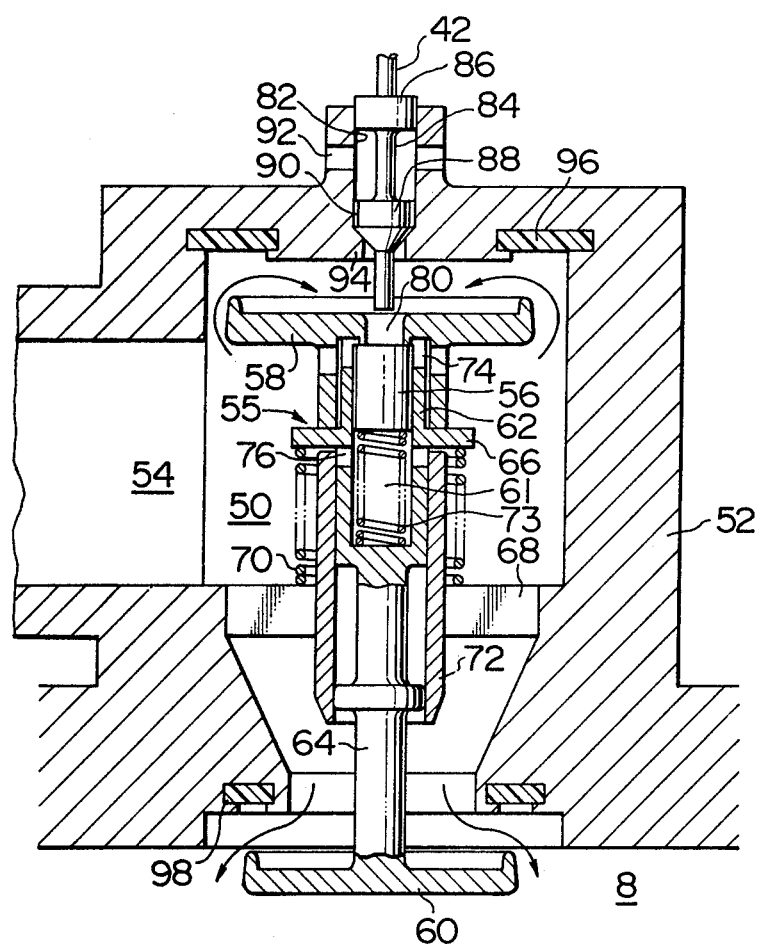
FIG. 4 is a view similar to FIG. 2 but showing both the daughter valve and the main valve in an open position.

As best shown in FIG. 2 to FIG. 4, the main valve 55 is preferably formed in two pieces by dividing the same at the daughter valve housing 62. This facilitates the fabrication and assembling of the pilot valve device.

Operation of the embodiment of the invention constructed as aforesaid will now be described. When it is desired to render the pilot valve device 2 operative, a mechanical signal is applied by the lower end 42 of the rod 36 of the hook mechanism 4 to the push rod 84 to move the latter downwardly. The force exerted on the push rod 84 must be such that it is greater than the sum of the pressure $F_1 = \pi/4d^2Pa$ (where $d$ is the diameter of the passage 80 and Pa is the pressure of the fluid in the pilot valve chamber 50) of the fluid acting on the underside of the daughter valve 56 and the biasing force $F_s$ of the spring 73. However, such force only needs to have a relatively small value, since the valve of $F_1$ is small because the diameter $d$ of the passage 80 is small and the value of $F_s$ is usually about 0.5 kg.

Downward movement of the push rod 84 brings the daughter valve 56 to an open position and permits the compressed air in the pilot valve chamber 50 to flow through the small apertures 74 and the passage 80 into the main valve actuating chamber 78 defined between the upper valve seat 58 and the top wall of the housing 52. Meanwhile, with the push rod 84 in its lower position, communication between the main valve actuating chamber 78 and the atmosphere is blocked (See FIG. 3). Accordingly, the main valve 55 is moved downwardly at high speed against the biasing force of the coil spring 70 by the difference in pressure $F_p = \pi/4D_2^2Pa$ (where $D_2$ is the diameter of the lower valve seat 60 and Pa is the pressure of the fluid in the pilot valve chamber 50) between the pressure of the compressed air in the main valve actuating chamber 78 and the pressure (which is normally an atmospheric pressure) in the operating valve actuating chamber 8. In this way, the lower valve seat 60 moves downwardly and the main valve 55 is brought to its open position (See FIG. 4). This permits the compressed air in the pilot valve chamber 50 to flow at high speed into the operating valve actuating chamber 8, thereby driving the operating valve piston 6 at high speed.

When the operating valve piston 6 reaches the end of its stroke at its final operating postion and a large quantity of compressed air flows into the operating valve actuating chamber 8, the pressure in the pilot valve chamber 50 becomes equal to the pressure in the operating valve actuating chamber 8, so that the pressure of the compressed air urging the main valve 55 to move downwardly to its open position is removed. This allows the main valve 55 to be returned to its closed position by the biasing force of the spring 70. Simultaneously as the main valve 55 is restored to its closed position, a reset mechanism (not shown), which is rendered operative as the operating valve piston 6 is driven, resets the rod 36 of the hook mechanism at its original position, thereby completing the restoration of the pilot valve device 2 to its original or inoperative position in which the daughter valve 56 is not opened by the push rod 84.

In accordance with the invention, the daughter valve 56 which can be actuated by a relatively small force (a force greater than the sum of $S_1 = \pi/4d^2Pa$ and $F_s$) is first actuated in response to a mechanical signal. Thus, actuation of the pilot valve device 2 can be readily achieved by a small force. This offers the following advantages. The biasing force of the operating spring 40 of the hook mechanism 4 can be reduced in magnitude. Accordingly, the surface pressure of the engaging portion of the hooks 22 and 26 can be made smaller. Thus, it is possible for the hook mechanism 4 to operate at a higher speed than conventional hook mechanisms in spite of the fact that the biasing force of the spring 40 is smaller than that of the springs used in the conventional hook mechanisms.

The mechanical signal applied by the hook mechanism only acts on the daughter valve 56 and does not act on the main valve 55. This makes it possible to use a large value for the pressing force $F_2 = \pi/4(D_1^2 - D_2^2)Pa$ (where $D_1$ is the diameter of the upper valve seat 58 and $D_2$ is the diameter of the lower valve seat 60) of the compressed air acting on the main valve 55 disposed in its closed position. Thus, it is possible to provide a sufficiently high surface pressure to the packings 96 and 98 even if the upper and lower valve seats 58 and 60 each have an area such that they do not become sharp enough to damage the packings. This improves the performance of the pilot valve device and increases its service life.

Generally, an increase in the number of valves of a pilot valve device tends to cause prolongation of the operation time because the time for charging the pilot valve device with compressed air is prlonged. This disadvantage of the prior art is eliminated in this invention in which the daughter valve 56 is located in the main valve 55. This arrangement markedly reduces the length of the passage through which the pilot valve device is charged with compressed air, so that no prolongation of the operating time is caused.

From the foregoing description, it will be appreciated that in the pilot valve device according to the invention, the daughter valve is first brought to its open position in response to a mechanical signal, and a compressed fluid is caused to act on the main valve as the daughter valve is brought to its open position, by virtue of the arrangement in which the daughter valve is located in the main valve. Because of this, it is possible to increase the size of the main valve and give a sufficiently large area to its valve seats, even if the hook mechanism used to apply a mechanical signal is small in size. Thus, the pilot valve device provided by the invention can have application in a large-sized operating valve for a circuit breaker of a large capacity which has hitherto been impossible to achieve. The device is capable of actuating the operating valve at high speed and reliable in performance.

We claim:

1. A pilot valve device for regulating the flow of a fluid adapted to be brought to an open position in response to a mechanical signal and to cause the fluid to actuate an operating valve, comprising a housing defining a pilot valve chamber, a main valve located in said housing and formed therein with a daughter valve chamber, and a daughter valve located in said daughter valve chamber in said main valve, and arranged substantially coaxially therewith, wherein said daughter valve is brought to an open position in response to the mechanical signal and causes a compressed fluid to act on said main valve to bring the same to an open position whereby the compressed fluid can be made to act on the operating valve, further comprising a push rod slidably fitted in an orifice formed in a top wall of said housing, said mechanical signal being applied to said daughter valve through said push rod, further comprising a first spring supported by an internal support plate formed integrally with said housing to urge said main valve by its biasing force to move to a closed position, a second spring mounted in said daughter valve chamber in said main valve to urge the daughter valve by its biasing force to move to a closed position, and a guide affixed to said support plate for slidably supporting said main valve, wherein said main valve comprises an upper valve seat, a lower valve seat and a daughter valve housing interposed between said upper and lower valve seats, said upper valve seat and the top wall of said housing defining therebetween, when said main valve and said daughter valve are both in the closed position, a main valve actuating chamber which is not in communication with said pilot valve chamber, said lower valve seat performing a valving action when said main valve is in the closed position to block communication between said pilot valve chamber and an operating valve actuating chamber, said daughter valve being brought to an open position when said mechanical signal is applied thereto through said push rod to open communication between the pilot valve chamber and said main valve actuating chamber, whereby the upper valve seat is moved downwardly to thereby move the lower valve seat downwardly so as to bring the main valve to an open position.

2. A pilot valve device as claimed in claim 1, wherein said daughter valve housing in said main valve is formed therein with small apertures for maintaining communication between said daughter valve chamber and said pilot valve chamber and also with a passage for communicating said daughter valve chamber with said main valve actuating chamber, so that when said daughter valve is brought to the open position said daughter valve chamber communication with said main valve actuating chamber through said passage and permits the fluid in said pilot valve chamber to flow into said main valve actuating chamber through said small apertures, said daughter valve chamber and said passage.

3. A pilot valve device as claimed in claim 2, wherein said push rod is formed therein with at least one larger diameter portion and said larger diameter portion is formed at its outer periphery with at least one slit so as to maintain said main valve actuating chamber in communication with the atmosphere when said push rod is in an inoperative position, said orifice which is located in the top wall of said housing for slidably receiving therein said push rod being formed therein with a projection with which said larger diameter portion is adapted to be brought into engagement when said push rod is actuated so as to thereby restrict the movement of the push rod and at the same time block communication between said main valve actuating chamber and the atmosphere.

4. A pilot valve device for regulating a flow of compressed fluid so that the compressed fluid is permitted to flow into an operating valve actuating chamber to actuate an operating valve when a mechanical signal is produced, comprising:

(a) housing means defining a pilot valve chamber receiving the compressed fluid;

(b) main valve means located in said pilot valve chamber and formed therein with a daughter valve chamber, said main valve means being normally in a closed position interrupting the flow of compressed fluid from said pilot valve chamber into the operating valve actuating chamber;

(c) said main valve means including valve seat means associated with an inner wall of said housing, and drive means for moving said main valve means to its open position by the action of the compressed fluid in said pilot valve chamber and said valve seat means associated with said inner wall of said housing so that the compressed fluid in said pilot valve chamber is permitted to flow into said drive means through said valve seat means simultaneously with initiation of movement of said main valve means to its open position;

(d) daughter valve means located in said daughter valve chamber in said main valve means, said daughter valve means being normally in a closed position interrupting communication between said pilot valve chamber and said drive means; and (e) means for bringing said daughter valve means to its open position in response to the mechanical signal to cause the compressed fluid in said pilot valve means to flow into said drive means through said daughter valve means and initiate movement of said main valve means to its open position whereby the compressed fluid in said pilot valve chamber directly flows into said drive means through said valve seat means and acts on said drive means to rapidly and positively move said main valve means to its open position.

5. A pilot valve device as claimed in claim 4, wherein said daughter valve is arranged substantially coaxially with said main valve.

6. A pilot valve device as claimed in claim 5, further comprising a push rod slidably fitted in an orifice formed in a top wall of said housing, said mechanical signal being applied to said daughter valve through said push rod.

7. A pilot valve device as claimed in claim 6, further comprising a first spring supported by an internal support plate formed integrally with said housing to urge said main valve by its biasing force to move to a closed position, a second spring mounted in said daughter valve chamber in said main valve to urge the daughter valve by its biasing force to move to a closed position, and a guide affixed to said support plate for slidably supporting said main valve.

8. A pilot valve device for regulating a flow of compressed fluid into an operating valve actuating chamber to actuate an operating valve when a mechanical signal is produced, comprising:

(a) housing means defining a pilot valve chamber receiving the compressed fluid;

(b) main valve means located in said pilot valve chamber and formed therein with a daughter valve chamber, said main valve means being normally in a closed position interrupting the flow of compressed fluid from said pilot valve chamber into the operating valve actuating chamber, and including surface means for displacing said main valve means to an open position communicating compressed fluid in said pilot valve chamber with said operating valve actuating chamber;
(c) daughter valve means located in said daughter valve chamber in said main valve means, said daughter valve means being normally in a closed position interrupting communication between said pilot valve chamber and said surface means;
(d) means for bringing said daughter valve means to an open position in response to the mechanical signal to cause the compressed fluid to flow to said surface means through said daughter valve means and initiate movement of said main valve means toward its open position; and
(e) means for communicating said surface means directly with the compressed fluid in said pilot valve chamber simultaneously with initiation of movement of the main valve means toward its open position, thereby producing a rapid opening of said main valve means.

* * * * *